United States Patent [19]

Susman et al.

[11] 3,758,849

[45] Sept. 11, 1973

[54] METAL DETECTOR SYSTEM HAVING IDENTICAL BALANCED FIELD COIL SYSTEM ON OPPOSITE SIDES OF A DETECTION ZONE

[75] Inventors: Leon Susman, Sudbury; Hugh C. Maguire, Westford; Carl E. Bohman, Sudbury, all of Mass.

[73] Assignee: Sperry Rand Corporation, New York, N.Y.

[22] Filed: Mar. 31, 1972

[21] Appl. No.: 240,222

[52] U.S. Cl. ............................. 324/41, 340/258 C
[51] Int. Cl. .......................................... G01r 33/00
[58] Field of Search .................. 324/41; 340/258 R, 340/258 C

[56] References Cited
UNITED STATES PATENTS

| 2,179,240 | 11/1939 | Breitenstein ................. 340/258 C |
| 3,020,470 | 2/1962 | Schawhan et al. ................. 324/41 |
| 3,697,972 | 10/1972 | Brown ................. 324/41 |

FOREIGN PATENTS OR APPLICATIONS

| 44,418 | 5/1961 | Poland ................. 324/41 |
| 827,527 | 2/1960 | Great Britain ................. 324/41 |

OTHER PUBLICATIONS

Leslie, E; How Mine Detectors Work; Radio–Craft July 1946; pp 676, 677 & 721.

*Primary Examiner*—Robert J. Corcoran
*Attorney*—Howard P. Terry

[57] ABSTRACT

A balanced field metal detector apparatus comprising a coil assembly including planar, generally rectangular loop configured multi-turn field and sensor coils disposed in partially overlapping minimum mutual inductive coupling relation and oriented so that the long dimension of the loops is skewed relative to the vertical in use of the apparatus. Employment of a pair of the detectors, one on each side of a pathway, with the respective coil assemblies skewed relative to the vertical oppositely to one another, enables detection of a metal object in the pathway by one or both of the detectors irrespective of the shape and orientation of the object, and by suitable processing of the sensor coil signals further enables determination of whether the object is located at the left, center or right side of the pathway.

5 Claims, 7 Drawing Figures

METAL DETECTOR SYSTEM HAVING IDENTICAL BALANCED FIELD COIL SYSTEM ON OPPOSITE SIDES OF A DETECTION ZONE

BACKGROUND OF THE INVENTION

1. Field of the Invention

This invention relates to metal detectors and more particularly to an improved metal detection apparatus utilizing a balanced field coil assembly of the type described in copending application Ser. No. 162,884 filed in the name of C. L. Bennett et al and assigned to the assignee of the present invention.

2. Description of the Prior Art

Metal detection by observance of magnetic field disturbances or anomalies produced by metal objects has been known for many years. It is only recently, however, that interest in such techniques has intensified as a consequence of the pressing need for more reliable security systems to preclude individuals from carrying dangerous weapons into banks, aboard aircraft and into other prohibited areas. Detection of such objects may be performed, for instance, by observing anomalies induced in the earth's magnetic field, by the presence of metal objects, in a region where the earth's field strength and direction is precisely known when devoid of metal objects. Such systems require extremely sensitive magnetic field responsive equipment and are hampered in operation by an inability to distinguish adequately between commonly carried objects such as keys or watches and metal objects of the character to be detected such as pistols, knives, grenades, etc. Present day security type metal detectors therefore preferably comprise a field or excitation coil energized from an alternating current power source and a sensor coil responsive to the magnetic field produced by the excitation coil for detecting disturbances caused by the presence of metal in the vicinity of the coil.

The aforementioned copending patent application discloses a detector apparatus in which planar rectangular loop-shaped field and sensor coils are held in rigid partially overlapping minimum mutual inductive coupling relation to one another, the long dimension of the rectangular coils typically being oriented vertically in use of the apparatus. It has been found, however, that with such orientation of the coils certain objects such as knives, stilettoes and icepicks, or other items of generally slender, elongated shape are not readily detected when carried in a vertical orientation parallel to the long dimension of the coil windings. One way to overcome this problem, of course, is to provide suitably arranged coils appropriately energized to cause the generated fields to rotate in a vertical plane sufficiently fast enough to assure that proper alignment of the field relative to the object will be established at least for an instant in order to detect the presence of the object. Obviously though, this can be accomplished only at the expense of considerable increase in complexity, cost and maintenance. It is accordingly a principal object of the present invention to provide a detector having a simple modified coil structure which is responsive to metal objects of any shape, elongated or otherwise, and having enhanced sensitivity to long slender weapons which may be conveniently carried in a vertical orientation as by attachment to an arm or leg band or belt carrier. Another feature of the invention relates to the provision of simple and inexpensive circuit means for compensating the long term drift normally experienced with metal detectors as a consequence of changing environmental conditions. Further objects and advantages of the invention will become apparent from a reading of the subsequent description of the preferred embodiments.

SUMMARY OF THE INVENTION

In accordance with the principles of the present invention, a balanced field type metal detector is constructed such that the minimum mutually inductive coupled field and sensor coils, when supported on a mounting structure in normal use and operation, will be skewed or canted relative to the true vertical irrespective of the slope of the ground or other surface upon which individuals walk when passing by the detector. The respective field and sensor coils may preferably be of planar rectangular loop configuration, as disclosed in the above-mentioned application, with the long dimension of the coils overlapping and skewed relative to the vertical or alternatively may be constructed in the form of right triangles in inverted relation to one another with the long dimension (hypotenuse) of the triangles overlapping and slanted with respect to the vertical. Other sloping configurations oriented in minimum mutual inductive coupling relation will be readily apparent to those skilled in the art.

In addition to the slanted coil configuration, the present invention incorporates improved signal processing circuits for facilitating initial nulling and compensating long term drift of the sensor coil output. Provision is also made for using a separate detector on each side of a passageway through which individuals are to pass and processing the signals from the respective sensor coils in a manner to determine approximately the location at which a detected object is carried on a person, that is right or left side or central region of the body. The nature of these signal processing circuits will be more fully understood from a reading of the following detailed description.

DESCRIPTION OF THE PREFERRED EMBODIMENTS

Figure 1:
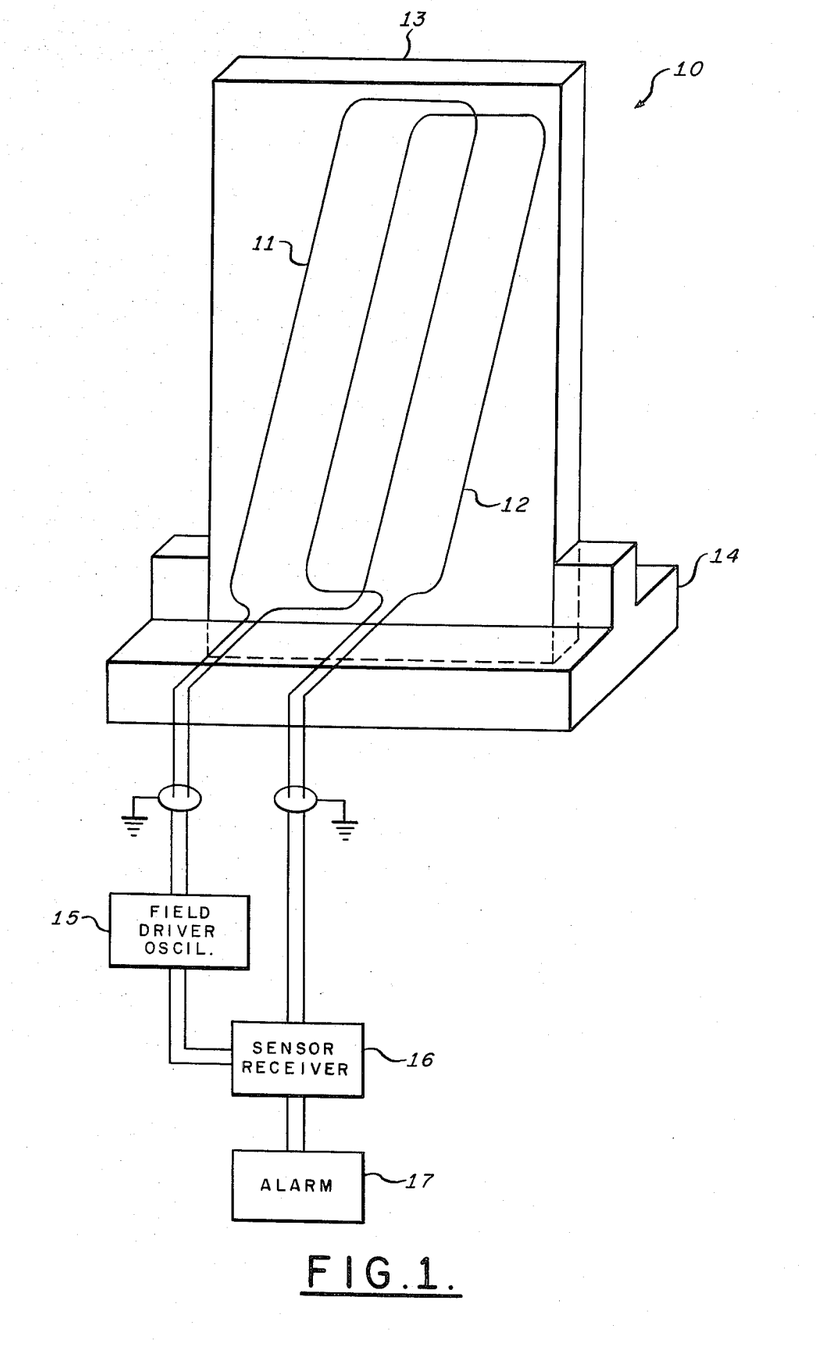
FIG. 1 is a partial perspective view of a skewed detector coil assembly constructed in accordance with the principles of the present invention and illustrating in simplified form the interconnection of the coils with the field driver and sensor receiver units of the detector apparatus.

Referring to FIG. 1, the metal detector coil assembly 10 comprises a field coil 11 and a sensor coil 12 having a generally rectangular or rhomboidal planar shape and supported on a masonite panel 13 in partially overlapping relation for minimum mutual inductive coupling between the respective coils. The field and sensor coils typically consist of multi-turns and measure approximately 1 foot wide by 6 feet high. The coil assembly also includes cover plates (not shown) over the front and rear of the masonite panel. The cover may be constructed of a molded fiberglass. Fabrication of the assembly can be accomplished by placing the coil structure onto the masonite panel. The sensor coil is positioned and secured so as to obtain a null output therefrom in response to alternating current electrical excitation applied to the field coil. Finally, the masonite panel is sandwiched between the fiberglass cover plates and is permanently sealed producing a resultant light weight, rigid, planar structure measuring approximately 2 feet wide by 6 feet high and about 2 inches thick.

In operation of the device, the coil assembly is supported in an upright condition on a support structure 14 adjacent a path or passageway along which individuals would be expected to pass. Excitation supplied to the field coil from the field driver oscillator 15 establishes a magnetic field in the vicinity of the path or passageway which in the absence of extraneous metal objects normally produces a null output at the sensor coil 12 coupled through the sensor receiver 16 to alarm 17. When a metal object of suitable size is carried past the coil assembly, the quiescent magnetic field condition is disturbed sufficiently to produce a sensor coil output signal of large enough magnitude to exceed a preset threshold and thereby trigger the alarm. A more detailed description of the detector operation, particularly concerning the coil assembly and sensor receiver electronics, will be provided hereinafter with reference to FIGS. 3 and 4.

Figure 2:
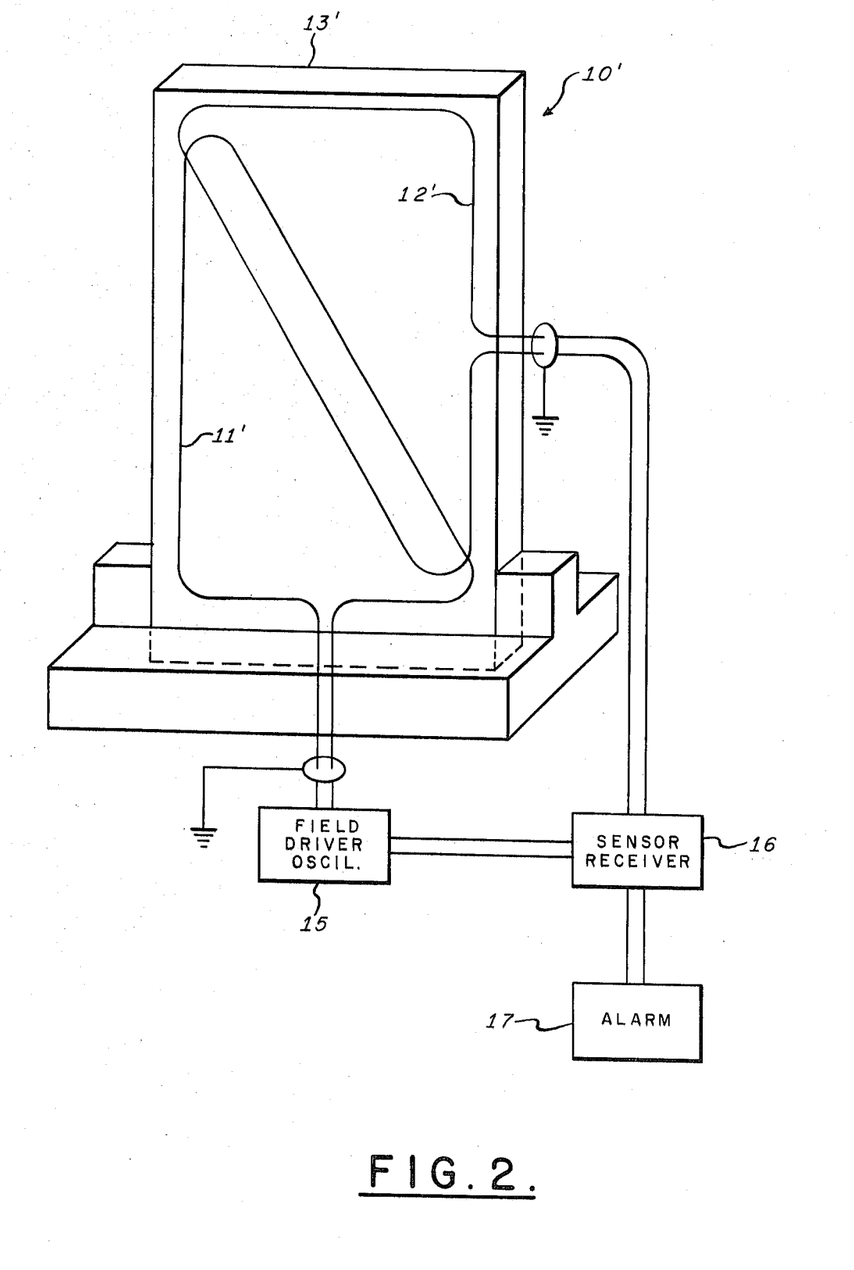
FIG. 2 is an illustration of an alternative skewed coil assembly embodying the principles of the invention.

FIG. 2 illustrates an alternative skewed coil assembly 10' wherein the field and sensor coils 11', 12' are each wound in a planar right triangular loop configuration with the long side of the triangles arranged in overlapping relation for minimum mutual inductive coupling. The connection of the field driver oscillator, sensor receiver, and alarm, and the arrangement of the support structure to hold the coil assembly so that the overlapping portions are skewed relative to the vertical is the same as explained with respect to FIG. 1. The configuration of FIG. 2, however, affords the advantage of minimizing the planar area of the coil assembly. Any reduction of sensitivity attendant to the reduced area of the coils is easily compensated simply by increasing the number of turns in the respective windings.

Figure 3:
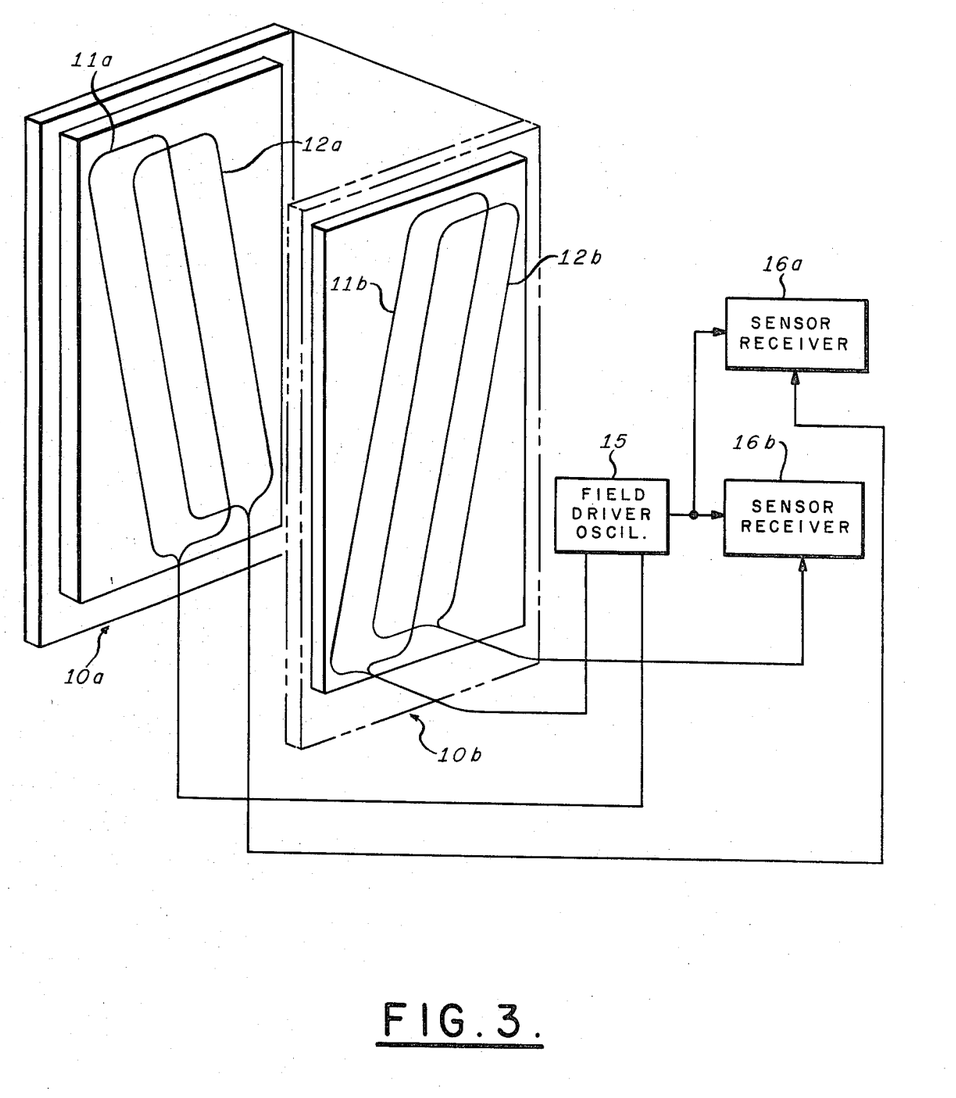
FIG. 3 shows a dual coil assembly set-up utilizing oppositely skewed coils on opposite sides of a passageway.

A preferred arrangement of a pair of coil assemblies 10a, 10b adjacent a passageway is shown in FIG. 3 where the coil assembly 10a comprising field coil 11a and sensor coil 12a on one side of the passageway is skewed with respect to the vertical opposite to the coil assembly 10b comprising field coil 11b and sensor coil 12b on the other side of the passageway. It will be noted that each of the field coils 11a, 11b is driven from a common oscillator 15 whereas separate sensor receivers 16a, 16b are used for processing the output signals of the respective sensor coils. With this setup a metal object of any shape, irrespective of its orientation in the passageway, will be detected by one or both of the coil assemblies. This arrangement will also enable the location of the metal object to be established as being either on the right, center or left side of the passageway as will be described more thoroughly a little later with reference to FIGS. 5 and 6.

Figure 4A:
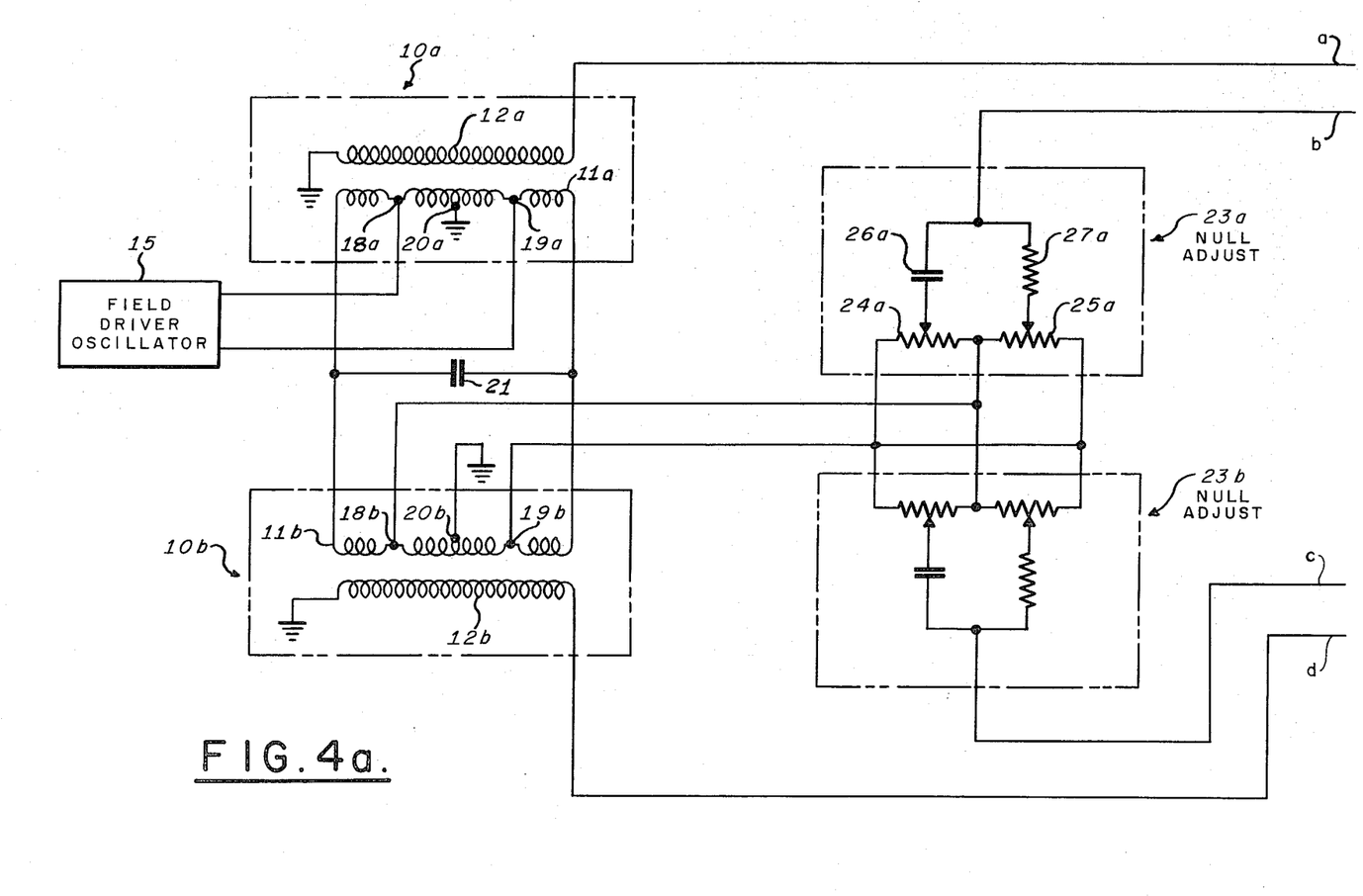
FIGS. 4a and 4b are electrical schematics partially in block form depicting the electronic circuits of the metal detector apparatus illustrated in FIG. 3.
Figure 4B:
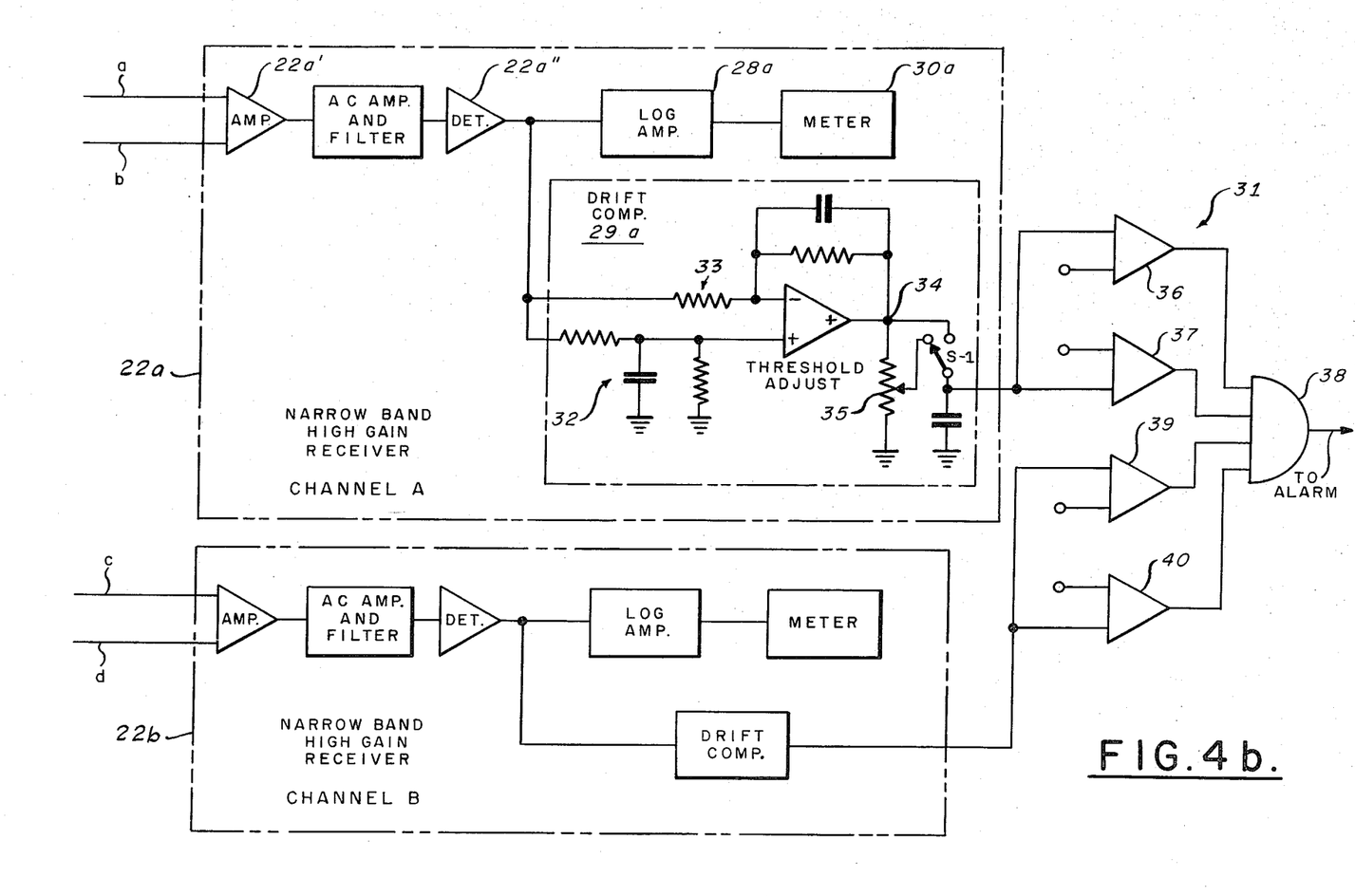

Referring now to FIGS. 4a and 4b, it will be noted that the interconnection of the field driver oscillator, the coil assemblies and the sensor receivers is actually slightly different than illustrated in FIGS. 1 and 2. As indicated, the output of the field driver oscillator connects to taps 18a and 19a positioned close to the grounded center tap 20a on field coil 11a. A capacitor 21 is connected across the end terminals of the field coil 11a and also in parallel with field coil 11b of the coil assembly 10b, mounted on the other side of the passageway from assembly 10a as shown in FIG. 3. The sensor coils 12a and 12b connect respectively to the input of narrow band high gain receivers 22a and 22b associated respectively with channels designated hereinafter as A and B. In accordance with good engineering practice for the purpose of reducing electromagnetic interference, each sensor coil may preferably have a grounded center tap and the ends of the coil coupled to the primary of an isolation transformer, the secondary of which is grounded at one end and connected at the other end to the input of the receiver. Null adjust circuits 23a and 23b also provide signals to the inputs of the respective receivers. Since channels A and B are identical in structure and operation, only channel A will be described in detail for simplicity of explanation. Null adjust circuit 23a, for instance, includes a pair of serially connected potentiometers 24a, 25a with slider contacts coupled respectively through capacitor 26a and resistor 27a to the input of the channel A receiver, the sensor coil and null adjust signals being differentially combined therein by means of summing amplifier 22a'. Excitation for the null adjust circuits is obtained from field coil 11b, taps 18b, 19b positioned close to the grounded center tap 20b, tap 18b being connected to the junction of potentiometers 24a, 25a and tap 19b to the other end of each of the potentiometers. The summing amplifier output connects through intermediate ac amplifier and filter stages to detector 22a'' which functions to detect the envelope of the modulated sensor coil signal. The detector output signal is applied to the input of logarithmic amplifier 28a and to drift compensator 29a. The output of the logarithmic amplifier in turn connects to meter 30a while the output of the drift compensator is coupled through combining logic circuit 31 to alarm 17.

In the case where only a single detector is used positioned on one side of a pathway, the null circuit excitation may be obtained from the field coil connected to the driver oscillator or directly from the oscillator if it provides a sinusoidal output. Preferably, however, in the interest of reduced cost, the field driver oscillator includes a class B operated push-pull output stage providing low voltage square wave excitation to field coil 11a, thus making it necessary to obtain the null adjust circuit excitation in the illustrated manner. Capacitor 21 connected in parallel with the field coils forms a high voltage parallel resonant circuit oscillating sinusoidally at the desired operating frequency, typically about 1 kilohertz, to establish the desired magnetic field in the passageway between the coil assemblies. In the case where the oscillator provides a stable sinusoidal output it will be appreciated, though not preferred, that a resonant circuit would not be required and therefore the capacitor could be eliminated.

As previously explained, each sensor coil is coupled to its associated field coil in minimum mutual inductive coupling relation to minimize the sensor coil output signal under quiescent conditions, that is in the absence of extraneous metal objects within the field produced by the excitation coil. Any sensor coil output signal that may occur, because of some slight inadvertent coupling to its related field coil or as a consequence of responding to the magnetic field established by the field coil associated with the sensor coil on the opposite side of the passageway, can be cancelled out or at least reduced to a minimum by means of the related null adjust circuit. This is performed in the following manner. Potentiometer 24a is varied by moving the slider in the appropriate direction to reduce the indication on meter 30a to a minimum. Then potentiometer 25a is varied to further reduce the meter indication. This procedure is repeated successively two or three times as necessary to achieve a true infinitesimally small null. Thereafter, a similar procedure is followed for nulling channel B. The use of logarithmic amplifiers in place of the customary linear amplifiers for driving the meters simplifies the nulling procedure in that the necessity for switching successively to more sensitive meter scales is obviated. This is significant because the necessity for scale switching could be particularly troublesome in view of the fact that the nulling procedure requires varying two potentiometers and probably will be performed by personnel having only rudimentary electronic skills.

Once the equipment has been set up as explained in the foregoing paragraphs, it is ready to be put into use for detecting metal objects. During the course of such use, however, long term drift of the sensot coil output is likely to occur for any of a variety of reasons, for example changing weather conditions or variations in the metal content of the area in which the apparatus is operating as caused by the random arrival and departure of motor operated vehicles or other large metallic objects. This problem is eliminated by arranging for the alarm 17 to be triggered only by transient or instantaneous signals of the type produced by a metal object moving comparatively rapidly past the coil assemblies. Operation in this manner is achieved by means of the drift compensator 29a connected to the output of the receiver. The drift compensator comprises a differential input type operational amplifier having inverting (negative) and non-inverting (positive) input terminals. Low frequency drift signals from the receiver are effectively integrated by network 32 connected to the non-inverting input terminal to balance out the effect of the same signal applied through network 33 to the inverting input terminal and thereby hold the signal at output terminal 34 at a null level close to zero. High frequency signals indicative of extraneous metal objects, on the other hand, are effective only through network 33 and thus change the signal level at output terminal 34. Threshold adjust potentiometer 35 connected to output terminal 34 enables the signal levels to be set for sensing objects of predetermined size, for instance a pistol or knife but not a cufflink or tieclasp. Sensitivity select switch S1 provides for a step change in the sensitivity to detect metal objects down to any desired small size.

It should be understood that the presence of an extraneous metal object may cause the drift compensator output signal to decrease as well as increase. For this reason the drift compensator output signal is applied to a pair of comparators 36, 37. Comparator 36 functions to produce a change in output signal level when the drift compensator output is more positive than the positive reference potential connected to comparator 36. Likewise comparator 37 functions to produce a change in output signal level when the drift compensator output is more negative than the negative reference applied to comparator 37. Thus, irrespective of whether the drift compensator output signal increases or decreases in response to a metal object in the vicinity of the coil assembly, when the change from the null exceeds a predetermined amount in accordance with the setting of the threshold adjust potentiometer or sensitivity switch S1 and the magnitude of the positive and negative reference potentials applied to the comparators, a signal will be supplied to the input of OR gate 38 to trigger alarm 17. Comparators 39 and 40 are connected in a similar fashion to the output of the drift compensator associated with channel B. Hence, a signal change of appropriate magnitude, positive or negative, in either channel will cause the alarm to be triggered.

Figure 5:
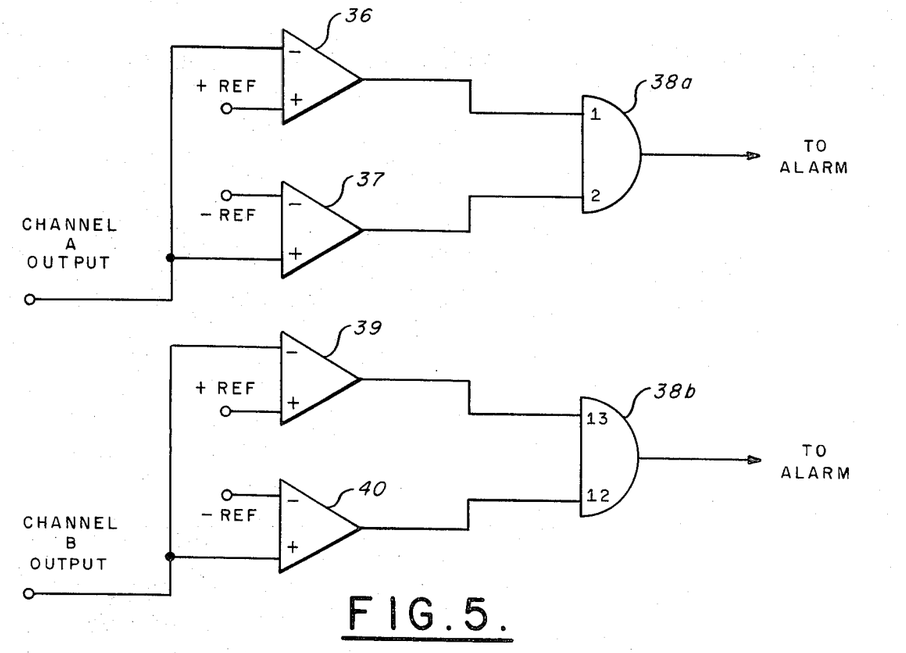
FIGS. 5 and 6 illustrate alternative logic combining circuits which may be used in the apparatus of FIG. 4 for more precisely determining the location of metal objects carried past the detector apparatus.

As an alternative to the combining logic arrangement shown in FIG. 4, the comparators may be connected as shown in FIG. 5 wherein comparators 36 and 37 of channel A are coupled to an OR gate 38a and comparators 39 and 40 associated with channel B are coupled to an OR gate 38b. With this arrangement, a signal change of sufficient magnitude at the output of both drift compensators will cause both alarms 17a and 17b connected respectively to OR gates 38a and 38b to be triggered; but by proper threshold adjustment, it will be possible to have only the channel associated with the sensor closest to the object produce an alarm. In this way, it can be determined whether the metal object is on one side or the other of the person carrying it through the passageway.

Figure 6:
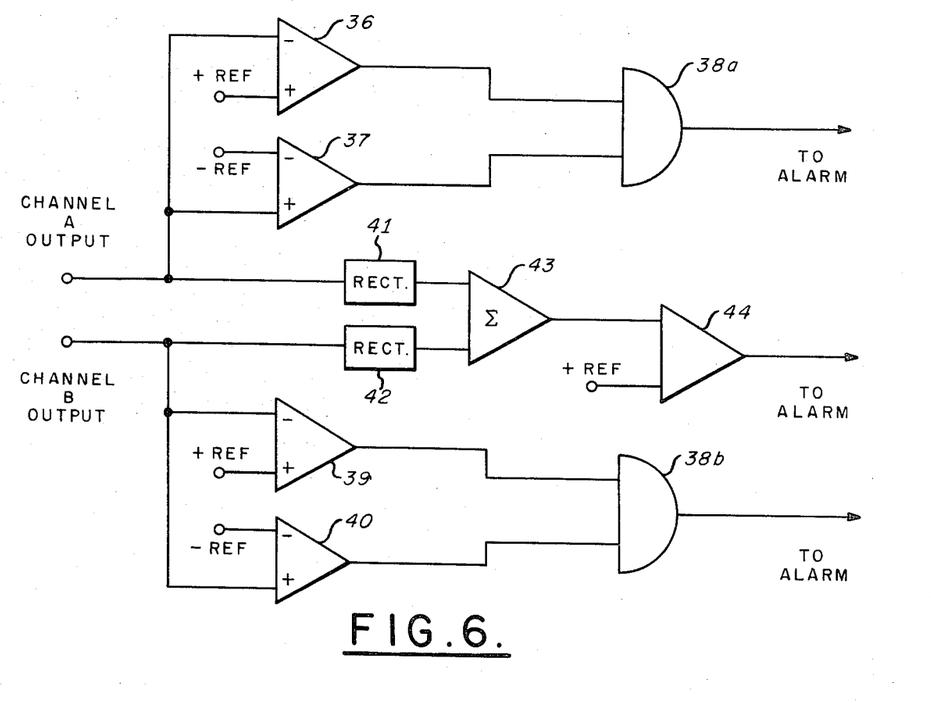

FIG. 6 depicts a third alternative for the combining logic circuits. In this instance, the comparators 36, 37, 39 and 40 are connected the same as in FIG. 5 for indicating the location of an object on one side or the other of the passageway; but, in addition, the drift compensator output signals of channels A and B are connected through full wave rectifiers 41, 42, respectively, to a summing circuit 43 which in turn connects to comparator 44 wherein the sum of the channel A and channel B output signals is compared with a positive reference voltage, in the manner of comparators 36, 37 39 and 40, for indicating when an object is located at the central region of the person carrying it through the passageway. In other words, by use of an appropriate reference voltage different from that used with comparators 36, 37 39 and 40, the circuit of FIG. 6 is made to indicate whether the object is on the right, left or center portion of the passageway.

While the invention has been described in its preferred embodiments, it is to be understood that the words which have been used are words of description rather than limitation and that changes within the purview of the appended claims may be made without departing from the true scope and spirit of the invention in its broader aspects.

We claim:
1. A metal detector system comprising
   a coil assembly including a field coil and a sensor coil disposed in partially overlapping substantially minimum mutual inductive coupling relation so that the sensor coil provides a zero or small residual output signal under an energized condition of the field coil in the absence of extraneous metal objects within the magnetic field produced by the energized field coil, a source of alternating current electrical excitation coupled to the field coil, a receiver tuned to a frequency of the electrical excitation applied to the coil assembly and including input summing means coupled to receive the sensor coil output signal, nulling means coupled to the input summing means for effectively cancelling residual output signal of the sensor coil, said receiver further including detector means coupled to the output of the summing means for detecting the envelope of the signal derived from the output of the summing means, and drift compensator means coupled to the output of the detector means for cancelling long term drift of the sensor coil output signal, said drift compensator means including amplifier means having a differential amplifier input stage, a resistor network coupling the output of the detector means to one input terminal of the differential amplifier input stage, and an integrator network coupling the output of the detector means to the other input terminal of the differential amplifier input stage.

2. A metal detector system comprising first and second generally planar coil assemblies disposed respectively on opposite sides of a passageway detection zone in parallel relation to one another, each coil assembly including a loop configured field coil and a loop configured sensor coil positioned in substantially vertical orientation and fixedly secured relative to one another in partially overlapping substantially minimum mutual inductive coupling relation whereby the sensor coil of each coil assembly provides a zero or small residual output signal under an alternating current electrically energized condition of the field coils in the absence of extraneous metal objects within the detection zone, and the field coils being connected in parallel and each having a grounded center tap and a pair of taps symmetrically disposed about the center tap, a source of alternating current electrical excitation coupled across the symmetrically disposed taps of the field coil of the first coil assembly, a capacitor connected across the field coils to form a resonant circuit tuned to a frequency of the electrical excitation provided by the alternating current source, a first receiver tuned to the resonant frequency of the coil assemblies and including input summing means coupled to the sensor coil of the first coil assembly, a second receiver tuned to the resonant frequency of the coil assemblies and including input summing means coupled to the sensor coil of the second coil assembly, and first and second null adjust circuits coupled respectively to the input summing means of the first and second receivers for cancelling residual signal produced at the output of the related sensor coil, each null adjust circuit including two series connected potentiometers having the remote ends thereof coupled to one of the symmetrically disposed taps of the field coil of the second coil assembly and the junction therebetween coupled to the other of the symmetrically disposed taps of the field coil of the second coil assembly with the slider contact of one potentiometer of each null adjust circuit coupled through a capacitor and the slider contact of the other potentiometer of each null adjust circuit coupled through a resistor to the input summing means of the associated receiver whereby residual signal of each sensor coil may be cancelled by appropriate setting of the slider contacts of the potentiometers of the related null adjust circuit.

3. The system of claim 2 wherein each receiver includes a logarithmic amplifier coupled to the output of the input summing means for compressing the amplitude of the summing means output signal for application to an indicator meter, whereby the null adjust procedure may be accomplished with minimum need for changes of the meter scale sensitivity and long term drift of the summing means output may be monitored with a selected meter scale sensitivity.

4. The system of claim 2 wherein each receiver further includes drift compensator means coupled to the output of the input summing means for cancelling long term drift of the summing means output signal, and an alarm coupled to the output of the drift compensator means for indicating when the drift compensator output signal of either receiver exceeds a predetermined threshold so that a determination may be made as to whether a detected object passed through the detection zone to the left or right of the center of the passageway.

5. A metal detector system comprising first and second generally planar coil assemblies disposed respectively on opposite sides of a passageway detection zone in parallel relation to one another, each coil assembly including a loop configured field coil and a loop configured sensor coil positioned in substantially vertical orientation and fixedly secured relative to one another in partially overlapping substantially minimum mutual inductive coupling relation whereby the sensor coil of each coil assembly provides a zero or small residual output signal under an alternating current electrically energized condition of the field coils and the absence of extraneous metal objects within the detection zone, a source of alternating current electrical excitation coupled to the field coils, a first receiver coupled to the sensor coil of the first coil assembly tuned to a frequency of the electrical excitation applied to the coil assemblies, a second receiver coupled to the sensor coil of the second coil assembly tuned to a frequency of the electrical excitation applied to the coil assemblies, means coupled to the first and second receivers respectively for cancelling residual signal produced at the output of the related sensor coil, means coupled to the output of the first receiver for indicating when the first receiver output signal exceeds a predetermined threshold set to enable detection of a prescribed metallic object in the half of the passageway adjacent the coil assembly connected to the first receiver, means coupled to the output of the second receiver for indicating when the second receiver output signal exceeds the predetermined threshold to enable detection of the prescribed metallic object in the half of the passageway adjacent the coil assembly connected to the second receiver, and means coupled to the output of the first and second receivers for indicating when both the first and second receiver output signals exceed a threshold set to enable detection of the prescribed metallic object in the center region of the passageway.

* * * * *